United States Patent
Rahman et al.

(10) Patent No.: US 9,686,050 B2
(45) Date of Patent: Jun. 20, 2017

(54) MITIGATING CROSS-LINK INTERFERENCE WHEN USING RECONFIGURABLE TDD

(71) Applicant: Telefonaktiebolaget L M Ericsson (publ), Stockholm (SE)

(72) Inventors: Imadur Rahman, Sollentuna (SE); Erik Eriksson, Linköping (SE); Eliane Semaan, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 81 days.

(21) Appl. No.: 14/652,540

(22) PCT Filed: Dec. 10, 2013

(86) PCT No.: PCT/SE2013/051481
§ 371 (c)(1),
(2) Date: Jun. 16, 2015

(87) PCT Pub. No.: WO2014/107122
PCT Pub. Date: Jul. 10, 2014

(65) Prior Publication Data
US 2015/0333877 A1    Nov. 19, 2015

Related U.S. Application Data

(60) Provisional application No. 61/748,815, filed on Jan. 4, 2013.

(51) Int. Cl.
*H04J 3/00* (2006.01)
*H04L 1/18* (2006.01)
(Continued)

(52) U.S. Cl.
CPC .......... *H04L 1/1887* (2013.01); *H04L 1/1812* (2013.01); *H04L 5/14* (2013.01); *H04W 72/082* (2013.01); *H04W 72/0446* (2013.01)

(58) Field of Classification Search
CPC ....... H04L 1/1887; H04L 1/1812; H04L 5/14; H04W 72/082; H04W 72/0446
See application file for complete search history.

(56) References Cited

U.S. PATENT DOCUMENTS

2010/0220597 A1 *  9/2010 Ji .......................... H04W 16/10
                                                              370/241
2011/0176461 A1    7/2011 Astely et al.
(Continued)

FOREIGN PATENT DOCUMENTS

WO        2012172476 A1    12/2012

OTHER PUBLICATIONS

3rd Generation Partnership Project, "3rd Generation Partnership Project; Technical Specification Group Radio Access Network; Evolved Universal Terrestrial Radio Access (E-UTRA); Physical Channels and Modulation (Release 11)", Technical Specification, 3GPP TS 36.211 V11.1.0, Dec. 1, 2012, pp. 10-12, 3GPP, France.
(Continued)

*Primary Examiner* — Afshawn Towfighi
(74) *Attorney, Agent, or Firm* — Coats & Bennett, P.L.L.C.

(57) ABSTRACT

Methods and apparatus are provided for mitigating cross-link interference. The method is implemented by a base station of a wireless communication system, the base station serving user terminals in a first cell. The method comprises selecting (610) a primary time division duplex, TDD, configuration designating uplink and downlink subframes for communication with the user terminals in the first cell, and determining (620) uplink subframes of the primary TDD configuration that are overlapping in time with downlink subframes of a TDD configuration used in a second cell. The method also comprises transmitting (630), to a user terminal in the first cell, a request to use a supplemental TDD configuration for transmitting uplink control information,
(Continued)

wherein uplink subframes of the supplemental TDD configuration are not overlapping in time with downlink subframes of the TDD configuration used in the second cell.

23 Claims, 7 Drawing Sheets

(51) Int. Cl.
*H04L 5/14* (2006.01)
*H04W 72/08* (2009.01)
*H04W 72/04* (2009.01)

(56) References Cited

U.S. PATENT DOCUMENTS

2011/0211503 A1* 9/2011 Che .................. H04L 5/0005
                                                                370/280
2013/0286902 A1* 10/2013 Chen .................. H04W 24/02
                                                                370/280

OTHER PUBLICATIONS

Shen, Z., et al., "Dynamic Uplink-Downlink Configuration and Interference Management in TD-LTE", IEEE Communications Magazine, Nov. 1, 2012, pp. 51-59, IEEE.
3rd Generation Partnership Project, "3rd Generation Partnership Project; Technical Specification Group Radio Access Network; Evolved Universal Terrestrial Radio Access (E-UTRA); Physical layer procedures (Release 11)", Technical Specification, 3GPP TS 36.213 V11.0.0, Sep. 1, 2012, pp. 1-143, 3GPP, France.

* cited by examiner

MITIGATING CROSS-LINK INTERFERENCE WHEN USING RECONFIGURABLE TDD

TECHNICAL FIELD

The disclosure relates to cross-link interference, and more specifically to a base station and a user terminal as well as methods for mitigating cross-link interference when using reconfigurable time division duplex configurations.

BACKGROUND

3GPP Long Term Evolution (LTE) is the fourth-generation mobile communication technologies standard developed within the 3rd Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an UTRAN and an E-UTRAN, a User Equipment (UE) is wirelessly connected to a radio base station commonly referred to as a NodeB in UMTS, and as an evolved NodeB (eNodeB) in LTE. A radio base station is a general term for a radio network node capable of transmitting radio signals to a UE and receiving signals transmitted by a UE. The eNodeB is a logical node in LTE and the radio base station is a typical example of a physical implementation of an eNodeB. A UE may more generally be referred to as a user device/terminal, a wireless device/terminal, or a mobile device/terminal.

FIG. 1 illustrates a radio access network in an LTE system. An eNodeB 110a serves a UE 150a located within the eNodeB's geographical area of service or the cell 100a. The eNodeB 110a is also connected via an X2 interface to a neighboring eNodeB 110b serving another UE 150b in cell 100b.

LTE systems can be configured for both time division duplex (TDD) operation and frequency division duplex (FDD) operation. In TDD systems, the base stations transmit and receive on the same carrier frequency. Uplink (UL) and downlink (DL) transmissions are separated in time by designating subframes as either UL subframes or DL subframes. In FDD systems, separate carrier frequencies are used for UL and DL transmissions.

In both TDD and FDD systems, there is always co-channel interference that needs to be taken into account. For DL communications, a UE receives interfering signals from the base stations in neighboring cells when receiving a DL transmission from its serving cell. The neighbor cell interference impairs the reception of the desired DL signals from the serving cell. For UL communications, a serving base station experiences interference from UEs transmitting on the UL in neighboring cells.

In FDD, UL and DL are on different carrier frequencies so there is no co-channel interference between UL and DL. However, there will still be cross-channel interference that needs to be handled by duplex filters. In TDD, UL and DL are on the same frequency, so a DL transmission in one cell may cause interference with an UL transmission in a neighboring cell. To mitigate this type of interference, TDD systems are usually time synchronized and aligned such that all cells transmit and receive at the same time. Guard periods are also inserted at the switching points.

In the current LTE standard, LTE-Rel 8, seven different TDD configurations are defined for LTE-TDD systems as shown in FIG. 2. One of the prime benefits of LTE-TDD systems is that the system available bandwidth can be adjusted dynamically to the traffic patterns at the base station. In FDD systems, the bandwidth in the UL and DL are fixed and cannot be changed based on traffic patterns or on the bandwidth requirement at any node. Reconfigurable TDD systems use the same TDD frame structures as the ones described in LTE-Rel 8 and illustrated in FIG. 2, but allow the TDD configuration to be changed depending on current traffic demands. The TDD configuration may be changed, for example, using Radio Resource Control (RRC) or Medium Access Control (MAC) signaling to indicate a different TDD configuration, overriding the one indicated in a System Information Block (SIB). This signaling will most likely be based on dedicated signaling, but broadcast solutions may also be considered. The main benefit of this approach is that everything on the physical layer can be kept unchanged with very limited modifications. The signaling overhead will likely be dependent on how often switching between TDD configurations is done and how many users that require the signaling. In any case, the additional signaling is expected to be low.

In reconfigurable TDD systems, the TDD configuration may be changed depending on traffic demands on a cell-by-cell basis. As a result, two neighboring base stations may use respective different resource allocations for UL and DL, which may result in DL-to-UL interference, i.e., transmitting base station to receiving base station interference. DL-to-UL interference, referred to herein as cross-link interference, occurs when one base station, referred to herein as an aggressor base station, is transmitting on the DL, while a second base station, referred to herein as a victim base station, is receiving transmissions from a UE in the UL. The different resource allocations result in interference between the base stations, as illustrated in FIG. 1. The aggressor base station 110a transmits a signal 112 in DL to a UE 150a in a cell. Another UE 150b in a neighboring cell served by the victim base station 110b transmits a signal 151 in the UL to the victim base station 110b. The victim base station 110b will when it receives the signal 151 from the UE 150b in the serving cell also receive the interfering signal 112 from the aggressor base station 110a.

Out of all the interference scenarios in TDD systems, DL-to-UL interference—also referred to as cross-link interference—is expected to impact the victim cell the most. This is due to that the coupling between the base stations is very high in many cases, e.g. due to a direct line-of-sight (LOS) path between them. This coupling will cause severe interference for the victim base station when receiving UL control and data channels. This will in turn affect the DL transmissions in the victim cell.

One area of particular concern is continuity of the Hybrid Automatic Repeat Request (HARQ) processes. A HARQ process is defined as the determination of HARQ responses at the DL reception in a certain DL subframe and the corresponding actual transmission of the HARQ responses in UL in another subframe. The HARQ transmission in the UL subframe takes place at least 4 ms after the reception of the DL subframe for which the HARQ responses were determined. What UL subframe that the HARQ responses such as acknowledgements/non-acknowledgements (ACK/NACK) are transmitted in, depends on the TDD configuration used in the serving cell in LTE-Rel 8 TDD. There is thus a specific mapping, or indexing, for HARQ acknowledgements related to each TDD configuration. The UL control information is transmitted from the UE to the base station via the Physical UL Control Channel (PUCCH) when no UL data is scheduled and via the Physical UL Shared Channel (PUSCH) when UL data is scheduled.

For a serving cell configured with TDD configuration 1 (as illustrated in FIG. 2), the HARQ transmission mapping will be done as explained in FIG. 4, illustrating the indexing between HARQ processes and subframes. DL subframes, 41 and 44, are illustrated with an arrow pointing downwards in the figure and UL subframes 42 are illustrated with an arrow pointing upwards. The HARQ transmission corresponding to data received in one DL subframe 41 is mapped to a certain UL subframe 42. The mapping is illustrated by a curved arrow 43, where the arrow 43 points towards the subframe to which the HARQ transmission is mapped. The HARQ transmission for two different DL subframes, 41 and 44, may be mapped to a same UL subframe 42.

Indexing between HARQ processes and subframes are not well defined when a serving cell switches between different DL/UL configurations, and even the number of HARQ processes may change. A fixed or a scheduled interruption may be needed to re-set all HARQ processes.

Furthermore, the impact of cross-link interference on HARQ acknowledgements is unknown. One problem with reconfigurable TDD systems is that when using the HARQ timing or mapping as described above, HARQ acknowledgements in one cell may fall on UL subframes experiencing significant cross-link interference from base stations transmitting in the DL at the same time in neighboring cells.

SUMMARY

It is therefore an object to address some of the problems outlined above, and to provide a solution for avoiding cross-link interference for UL control information in reconfigurable TDD systems. This object and others are achieved by the methods, the base station, and the user terminal according to the independent claims, and by the embodiments according to the dependent claims.

In accordance with a first aspect, a method for mitigating cross-link interference is provided. The method is implemented by a base station of a wireless communication system, the base station serving user terminals in a first cell. The method comprises selecting a primary TDD configuration designating UL and DL subframes for communication with the user terminals in the first cell, and determining UL subframes of the primary TDD configuration that are overlapping in time with DL subframes of a TDD configuration used in a second cell. The method also comprises transmitting, to a user terminal in the first cell, a request to use a supplemental TDD configuration for transmitting UL control information, wherein UL subframes of the supplemental TDD configuration are not overlapping in time with DL subframes of the TDD configuration used in the second cell.

In accordance with a second aspect, a method for mitigating cross-link interference is provided, where the method is implemented by a user terminal in a first cell, served by a base station of a wireless communication system. The user terminal is configured to use a primary TDD configuration designating UL and DL subframes for communication with the base station. The method comprises receiving, from the base station, a request to use a supplemental TDD configuration different from the primary TDD configuration for transmitting UL control information. The method also comprises adopting the supplemental TDD configuration for transmission of UL control information in response to the received request, and transmitting control information to the base station in UL subframes according to the supplemental TDD configuration.

In accordance with a third aspect, a base station of a wireless communication system for mitigating cross-link interference is provided. The base station is configured to serve user terminals in a first cell. The base station comprises a processor, a memory, and a transmitter. The memory contains instructions executable by said processor, whereby said base station is operative to select a primary TDD configuration designating UL and DL subframes for communication with the user terminals in the first cell, and determine UL subframes of the primary TDD configuration that are overlapping in time with DL subframes of a TDD configuration used in a second cell. The base station is further operative to transmit via the transmitter to a user terminal in the first cell, a request to use a supplemental TDD configuration for transmitting UL control information. UL subframes of the supplemental TDD configuration are not overlapping in time with DL subframes of the TDD configuration used in the second cell.

In accordance with a fourth aspect, a user terminal for mitigating cross-link interference, configured to be served in a first cell by a base station of a wireless communication system is provided. The user terminal is configured to use a primary TDD configuration designating UL and DL subframes for communication with the base station. The user terminal comprises a processor, a memory, a receiver, and a transmitter. The memory contains instructions executable by said processor, whereby said user terminal is operative to receive via the receiver from the base station, a request to use a supplemental TDD configuration different from the primary TDD configuration for transmitting UL control information. The user terminal is further operative to adopt the supplemental TDD configuration for transmission of UL control information in response to the received request, and transmit control information via the transmitter to the base station in UL subframes according to the supplemental TDD configuration.

An advantage of embodiments is that UL control information can be protected from excessive cross-link interference in a victim base station, which also affects the subsequent DL transmission in the victim cell.

Other objects, advantages and features of embodiments will be explained in the following detailed description when considered in conjunction with the accompanying drawings and claims.

DETAILED DESCRIPTION

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Figure 1:
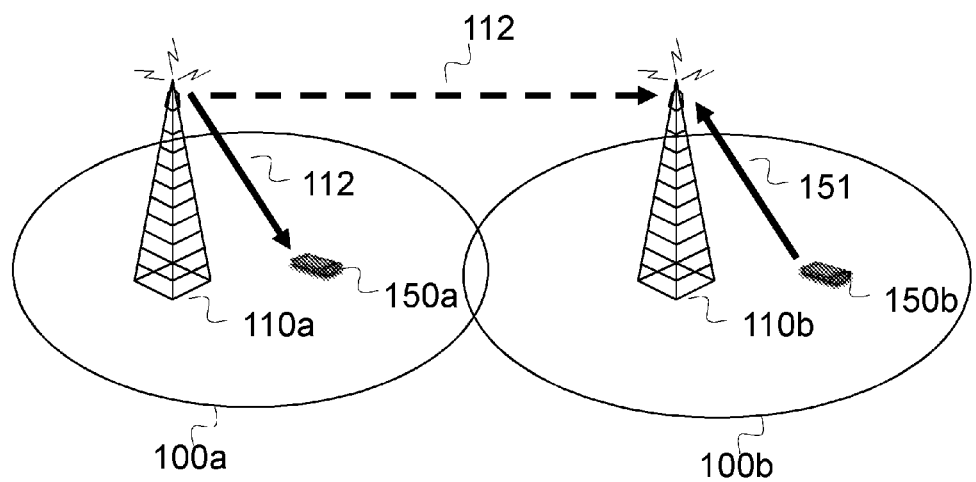
FIG. 1 is a schematic illustration of an LTE radio access network and of one interference scenario.

Embodiments are described in a non-limiting general context in relation to an example scenario in an LTE system applying reconfigurable TDD or applying different TDD configurations in different cells, with an aggressor and a victim base station, as illustrated in FIG. 1. In the example scenario, the supplemental TDD configuration is used for HARQ transmissions. However, it should be noted that the embodiments may be applied to any radio access network technology applying reconfigurable TDD or applying different TDD configurations in different cells, and for any type of UL control information that is mapped in the same way as HARQ transmissions, based on indexing with respect to the TDD configuration used in the cell.

Embodiments of the present invention provide methods and apparatus for avoiding cross-link interference when two neighboring base stations are using different TDD configurations. When a base station detects that a neighboring cell is using a different TDD configuration, the base station may request UEs scheduled to transmit UL control information to use a supplemental TDD configuration. The request may include a time duration specifying a time period for using the supplemental TDD configuration. In some embodiments, the supplemental TDD configuration is used for HARQ transmissions from the UE to the serving base station.

Exemplary embodiments of the invention comprise methods implemented by a base station for mitigating cross-link interference. In one exemplary method, the base station selects a primary TDD configuration designating the UL and DL subframes for communication between the serving base station and user terminals in the serving cell. In the event that a neighboring cell uses a different TDD configuration, the base station determines which UL subframes are impacted and identifies the UEs scheduled to transmit in the impacted UL subframes. The base station may request that the UEs scheduled in the impacted UL subframes use a supplemental TDD configuration so that the control information is transmitted in UL subframes that are not subject to interference from the neighboring base station. In some embodiments, the base station may specify a time interval to the UE for using the supplemental TDD configuration.

Other embodiments of the invention comprise a base station for a wireless communication network. The base station comprises transceiver circuits for transmitting signals to and receiving signals from UEs in a cell served by the base station. The base station also comprises processing circuits for processing signals transmitted and received by the base station. The processing circuits may include an Interference Mitigation Circuit (IMC) to mitigate interference from neighboring cells. The IMC may be configured to detect that a neighboring base station is using a different TDD configuration than the serving base station. In response to such detection, the IMC is further configured to determine which UL subframes are impacted and to identify the UEs scheduled to transmit in the impacted UL subframes. The IMC is further configured to request that the UEs scheduled in the impacted UL subframes use a supplemental TDD configuration so that the control information is transmitted in UL subframes that are not subject to interference from the neighboring base station. In some embodiments, the base station may specify a time interval to the UE for using the supplemental TDD configuration.

Other embodiments of the invention comprise methods implemented by a UE for mitigating neighbor cell interference. The UE transmits control information in UL subframes according to a primary TDD configuration. The UE may switch from the primary TDD configuration to a supplemental TDD configuration responsive to a request from the serving base station. The request may specify a time period for using the supplemental TDD configuration. When the supplemental TDD configuration is in use, the UE transmits control information to the serving base station in UL subframes according to the supplemental TDD configuration.

Other embodiments of the invention comprise a UE in a wireless communication network. In one exemplary embodiment, the UE comprises transceiver circuits for transmitting signals to and receiving signals from a serving base station, and processing circuits for processing signals transmitted and received by the UE. The processing circuits may include an IMC to mitigate interference from neighboring cells. The IMC is configured to adapt the TDD configuration of the UE responsive to a request from the serving base station. In some embodiments, the UE is configured to transmit control information in UL subframes according to a primary TDD configuration. The IMC is configured to switch the UE from the primary TDD configuration to a supplemental TDD configuration responsive to a request from the serving base station. The request may specify a time period for using the supplemental TDD configuration. When the supplemental TDD configuration is in use, the UE transmits control information to the serving base station in UL subframes according to the supplemental TDD configuration.

The problem appearing in reconfigurable TDD systems where UL control information may be affected by cross-link interference from neighboring base stations transmitting in the DL, is thus addressed by a solution where a supplemental TDD configuration is used for determining the mapping for the UL control information, such that the UL control information is transmitted in UL subframes which are not affected by the cross-link interference. UL control information such as HARQ transmissions are not scheduled by the base station. Timing of the HARQ transmissions are decided based on a mapping specific to the TDD configuration used in the cell, which may thus be referred to as an implicit allocation. The same problem of cross-link interference does not appear for the transmission of e.g. UL user data, as UL user data is always scheduled by the serving base station such that subframes affected by interference may be avoided.

In LTE systems, UEs transmit UL control information in two ways. First, when UL user data is scheduled, then UL control information is transmitted using the PUSCH. Second, when no UL user data is scheduled, the UL control information is transmitted using the PUCCH. In Rel 11 LTE TDD (3GPP TS 36.213 V11.0.0 (2012-09), Section 10.2), a mechanism is defined in the context of carrier aggregation where an advanced UE can use a reference configuration for UL control data transmission.

In one embodiment of the invention, if a victim cell uses a UL heavy TDD configuration, or at least a TDD configuration where two out of five subframes are used for UL transmission, and if a neighboring cell uses a DL heavy TDD configuration, cross-link interference may occur in either or both of the $2^{nd}$ and $3^{rd}$ UL subframes. The $1^{st}$ UL subframe in a TDD configuration occurs at the same time in all TDD configurations (subframe #2 in FIG. 2). When the victim base station learns that another base station uses a different TDD configuration, e.g., a DL heavier configuration, it identifies the UL subframes that are affected by the DL transmissions from the other base station. If a UE is scheduled in the UL in the victim cell, the serving base station may ask the UE to use a supplementary TDD configuration for HARQ transmissions, e.g., to use the TDD configuration of the aggressor cell or base station. In addition, the serving base station may specify a time limit for using the supplementary configuration.

Figure 3:
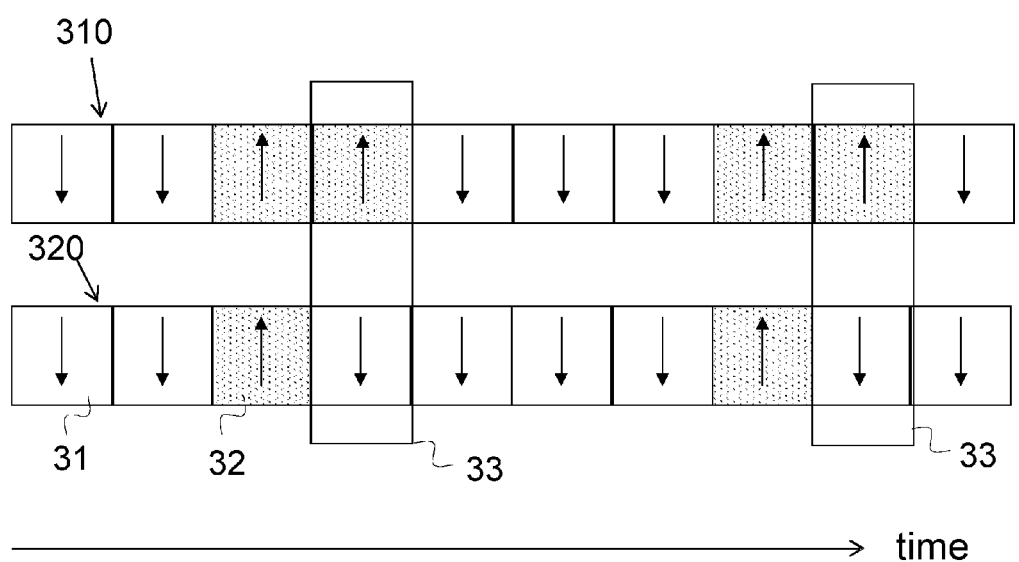
FIG. 3 is a schematic illustration of cross-link interference between a neighbor cell and a serving cell.
Figure 2:
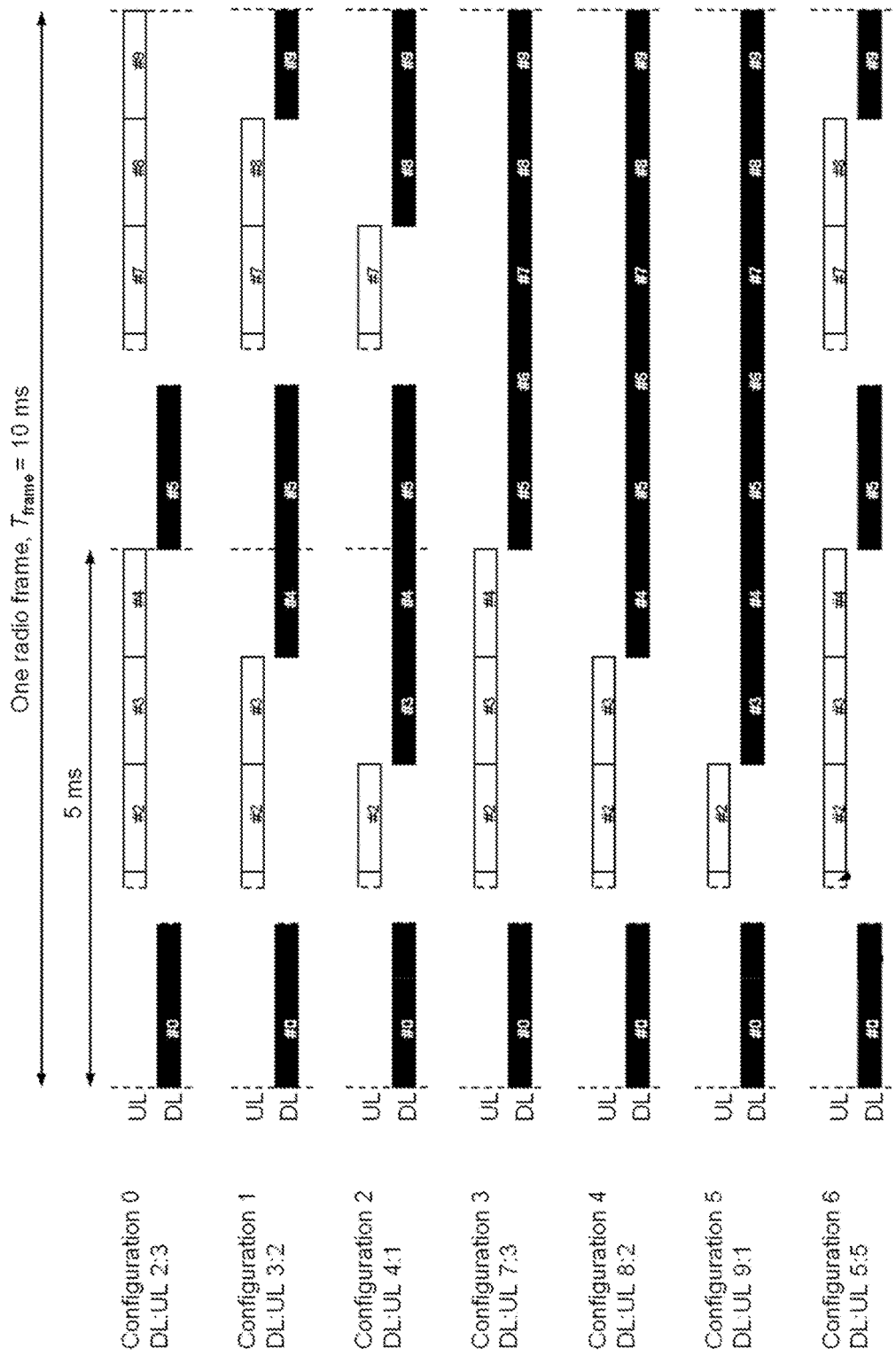
FIG. 2 is a schematic illustration of available TDD configurations for LTE systems.
Figure 4:
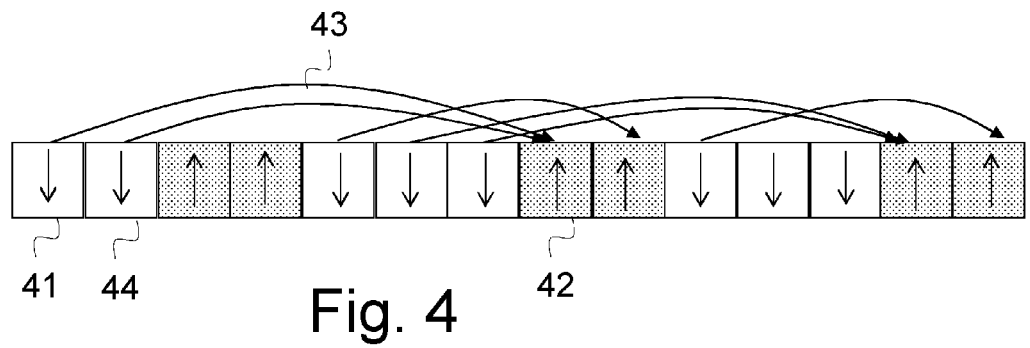
FIG. 4 is a schematic illustration of HARQ transmission mapping for TDD configuration 1 in an LTE system using TDD.

In an exemplary embodiment, if the serving base station and cell uses the 3:2 TDD configuration, i.e., configuration 1 in FIG. 2, and a neighboring base station and cell uses the 4:1 TDD configuration, i.e., configuration 2 in FIG. 2, the UEs in the serving cell will experience strong interference from the aggressor neighboring base station in subframe #3, i.e., in the $2^{nd}$ UL subframe. It should be noted that subframe numbering starts at #0. The interference in such a case is illustrated in FIG. 3. Subframes of a victim cell 310 and subframes of an aggressor cell 320 are illustrated, where DL subframes 31 are illustrated with an arrow pointing downwards in the figure and UL subframes 32 are illustrated with an arrow pointing upwards. The subframes surrounded by a square 33 are the subframes where UL subframes of the 3:2 TDD configuration of the victim cell coincides with DL subframes of the 4:1 TDD configuration of the aggressor cell. The serving base station of the victim cell may instruct an advanced UE to use a supplementary configuration instead of the 3:2 TDD configuration, e.g., the 4:1 TDD configuration, when transmitting UL control information such as HARQ acknowledgements, to avoid the interference from the aggressor base station. The supplemental TDD configuration may be the same TDD configuration as the one used in the aggressor cell, i.e. the 4:1 TDD configuration as suggested above, or it may be some other TDD configuration that avoids interference when the UE is transmitting UL control information.

Figure 5A:
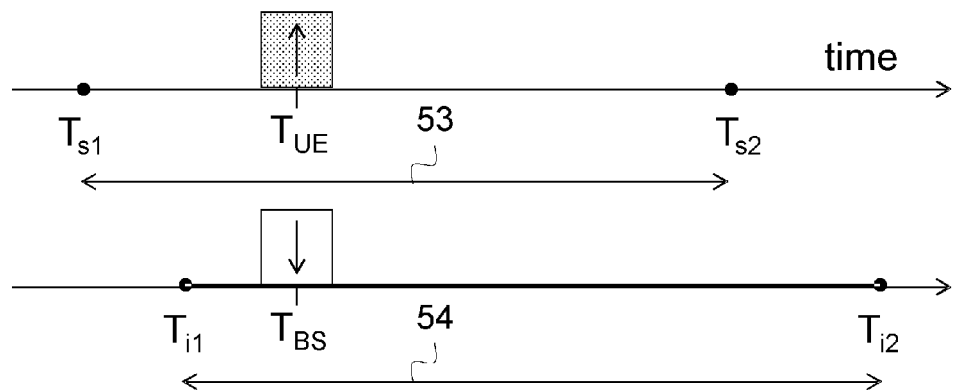
FIGS. 5*a* and 5*b* are schematic illustrations of timing examples for using a supplementary TDD configuration.
Figure 5B:
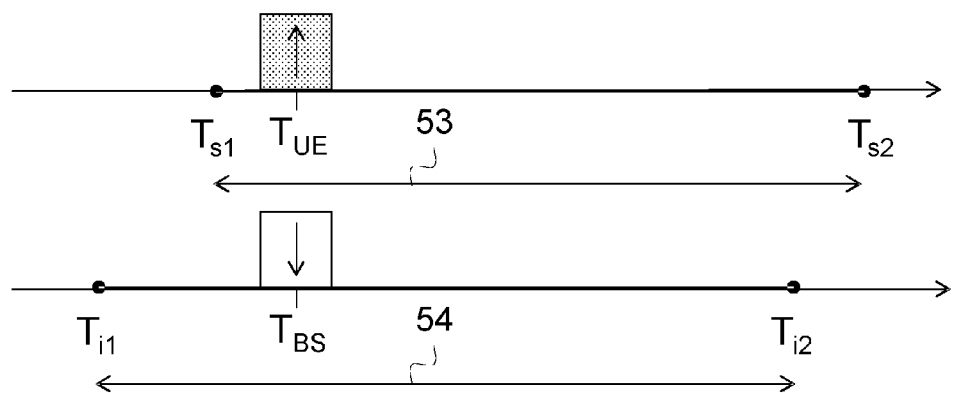

In some embodiments, a time limit may be specified for the use of the supplemental TDD configuration. The time limit may be based on the RRC configurations of the serving and aggressor cells, as illustrated in FIGS. 5a and 5b. For example, the serving base station can use information about the time span of the current aggressor neighbor cell TDD configuration to accordingly instruct the UE to adapt the supplementary configuration for a certain period of time. The beginning and end of RRC configuration windows of victim cells 53 may be denoted $T_{s1}$ and $T_{s2}$ respectively. The beginning and end of RRC configuration windows for the aggressor cell 54 may be denoted $T_{i1}$ and $T_{i2}$. The timing of an UL subframe transmission in a victim cell $T_{UE}$ coincides with the timing of a DL subframe transmission $T_{BS}$ in an aggressor cell when the RRC configuration windows overlap. If a UE is scheduled to transmit HARQ acknowledgements in a victim cell, the base station in the victim cell can instruct the UE to transmit the UL control information using a supplementary TDD configuration that is similar to the TDD configuration used in the interfering aggressor cell. For the case where $T_{s2} < T_{i2}$, i.e., the time window of the RRC configuration window of the victim cell starts earlier than the RRC configuration window of the aggressor cell, the base station may instruct the UE to use the supplemental configuration for a duration of $[T_{s2}-T_{UE}]$ as shown in FIG. 5a, where $T_{UE}$ indicates the timing of the UL subframe carrying the HARQ transmission. For the case where $T_{s2} > T_{i2}$, i.e., the time window of the RRC configuration window of the victim cell starts later than the RRC configuration window of the aggressor cell, the base station may instruct the UE to use the supplementary TDD configuration for a duration of $[T_{i2}-T_{UE}]$, as shown in FIG. 5b.

In exemplary embodiments, new TDD configurations are introduced for the HARQ transmission mapping. Such mappings would avoid HARQ feedback in an UL subframe where it was initially supposed to be sent based on serving cell TDD configuration. HARQ transmission mappings using new TDD configurations can be obtained by introducing a new TDD configuration, i.e. another TDD configuration than the existing TDD configuration used for user data transmission in a cell, or by time-shifting the existing TDD configuration.

Furthermore, in embodiments the new TDD configuration could be applied in order to protect two base stations using the same TDD configuration but placed far apart, although still with a strong coupling e.g. due to a direct LOS situation. The new TDD configuration may also be used in case of two base stations that are not fully time synchronized, where the end of a DL transmission may interfere the beginning of an UL transmission.

Methods and Apparatus

Figure 6A:
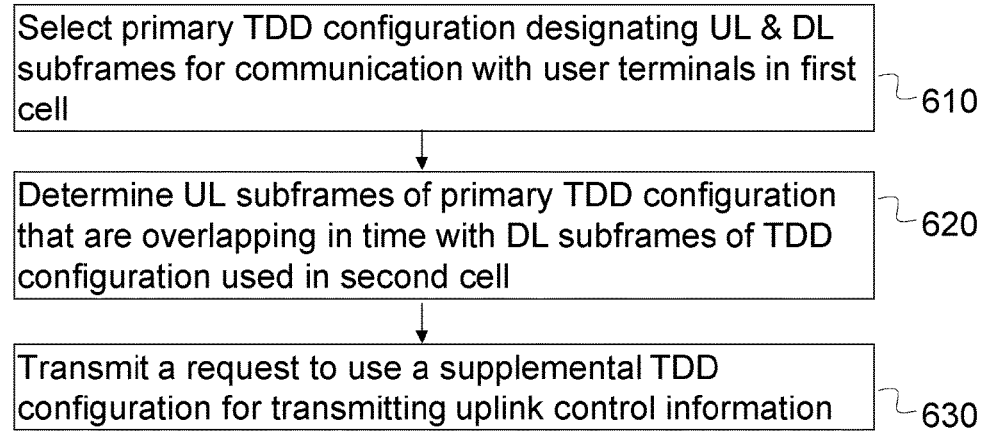
FIGS. 6*a-b* are flowcharts illustrating embodiments of a method in the base station.

FIG. 6a is a flowchart illustrating an embodiment of a method for mitigating cross-link interference implemented by a base station of a wireless communication system. The base station is serving user terminals in a first cell. As in the example embodiments described previously, the user terminals may be UEs, and the base station may be an eNodeB in LTE. The method comprises:

610: Selecting a primary TDD configuration designating UL and DL subframes for communication with the user terminals in the first cell.
  620: Determining UL subframes of the primary TDD configuration that are overlapping in time with DL subframes of a TDD configuration used in a second cell. The TDD configuration used in the second cell may be a different TDD configuration than the primary TDD configuration. When the second cell is a neighboring cell close to the served cell, a different TDD configuration used in the neighboring cell causes cross-link interference problems. However, if the second cell is a cell at some distance from the serving cell although the base station serving the second cell is strongly coupled to the base station serving the first cell due to e.g. direct LOS, the second cell may cause cross-link interference even if the TDD configuration used in the second cell is the same as the one used in the first cell due to that the distance introduces a delay. The time shift of the subframes may thus introduce cross-link interference in such a case.
  630: Transmitting, to a user terminal in the first cell, a request to use a supplemental TDD configuration for transmitting UL control information. The UL control information may be a HARQ response, such as a HARQ acknowledgement. UL subframes of the supplemental TDD configuration are not overlapping in time with DL subframes of the TDD configuration used in the second cell. In one embodiment, the supplemental TDD configuration is the same as the TDD configuration used in the second cell. This would typically be the case when a different TDD configuration is used in a neighbor cell, as in the example embodiment described above with reference to FIG. 3. However, the supplemental TDD configuration may be some other TDD configuration that avoids interference when the UE is transmitting UL control information. In one embodiment, the supplemental TDD configuration is a time shifted version of the primary TDD configuration, e.g. in case delayed DL subframes from a far away base station introduces cross-link interference in the victim cell.

The embodiment illustrated in FIG. 6a enables a reduction of the cross-link interference for the UL control information, as the UL control information will be transmitted by the UE in UL subframes which are not subject to cross-link interference from any neighboring base stations transmitting in the DL.

Figure 6B:
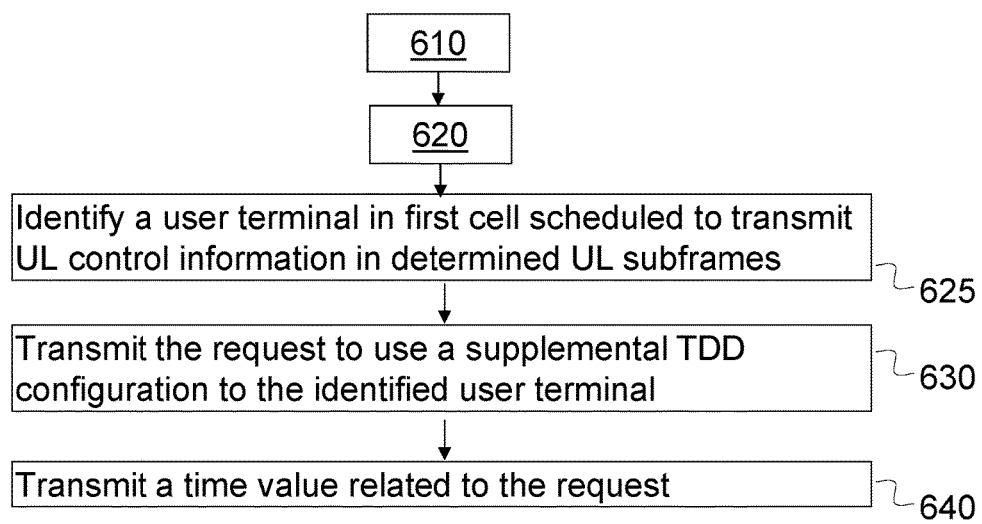

FIG. 6b is a flowchart illustrating another embodiment of the method for mitigating cross-link interference performed in the base station. The method comprises the selecting 610 of primary TDD configuration and determining 620 of UL subframes described above. The method further comprises:

625: Identifying a user terminal in the first cell scheduled to transmit UL control information in the determined UL subframes of the primary TDD configuration that are overlapping in time with DL subframes of the TDD configuration used in the second cell.

The request to use the supplemental TDD configuration is then transmitted to the identified user terminal in 630. The method may further comprise:

640: Transmitting, to the user terminal in the first cell, a time value related to the request to use a supplemental TDD configuration. The time value defines a time duration for the requested use of the supplemental TDD configuration. The time value may be derived based on RRC configuration time windows of the first and the second cell respectively, as explained with reference to FIG. 5a-b above.

Figure 7A:
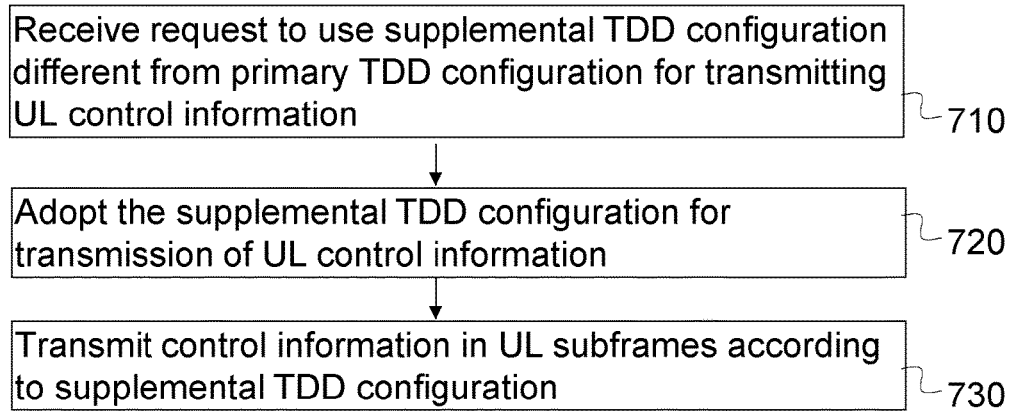
FIGS. 7*a-b* are flowcharts illustrating embodiments of a method in the user terminal.

FIG. 7a is a flowchart illustrating an embodiment of a method for mitigating cross-link interference implemented by a user terminal in a first cell. The first cell is served by a base station of a wireless communication system. The user terminal is configured to use a primary TDD configuration designating UL and DL subframes for communication with the base station. The method comprises:

710: Receiving, from the base station, a request to use a supplemental TDD configuration different from the primary TDD configuration for transmitting UL control information. The UL control information may be a HARQ response. The supplemental TDD configuration may be different from the primary TDD configuration with regards to the type of TDD configuration. Alternatively, the supplemental TDD configuration may be a time shifted version of the primary TDD configuration.

720: Adopting the supplemental TDD configuration for transmission of UL control information in response to the received request.

730: Transmitting control information to the base station in UL subframes according to the supplemental TDD configuration.

Figure 7B:
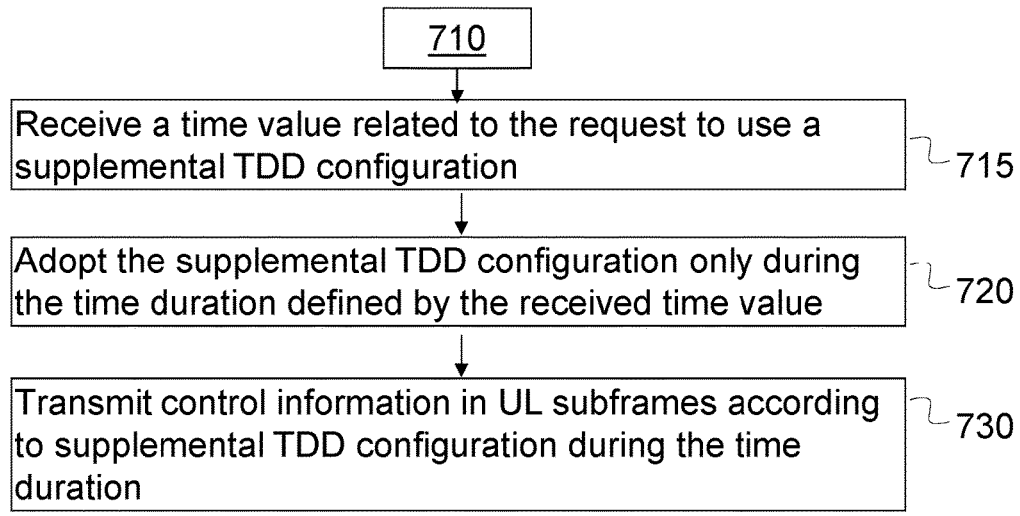

FIG. 7b is a flowchart illustrating another embodiment of the method for mitigating cross-link interference performed in the user terminal. The method comprises receiving 710 the request from the base station. The method then further comprises:

715: Receiving, from the base station, a time value related to the request to use a supplemental TDD configuration. The time value defines a time duration for the requested use of the supplemental TDD configuration.

720: Adopting the supplemental TDD configuration only during the time duration defined by the received time value, and thus 730: Transmitting control information to the base station in UL subframes according to the supplemental TDD configuration during the time duration defined by the received time value.

Figure 8:
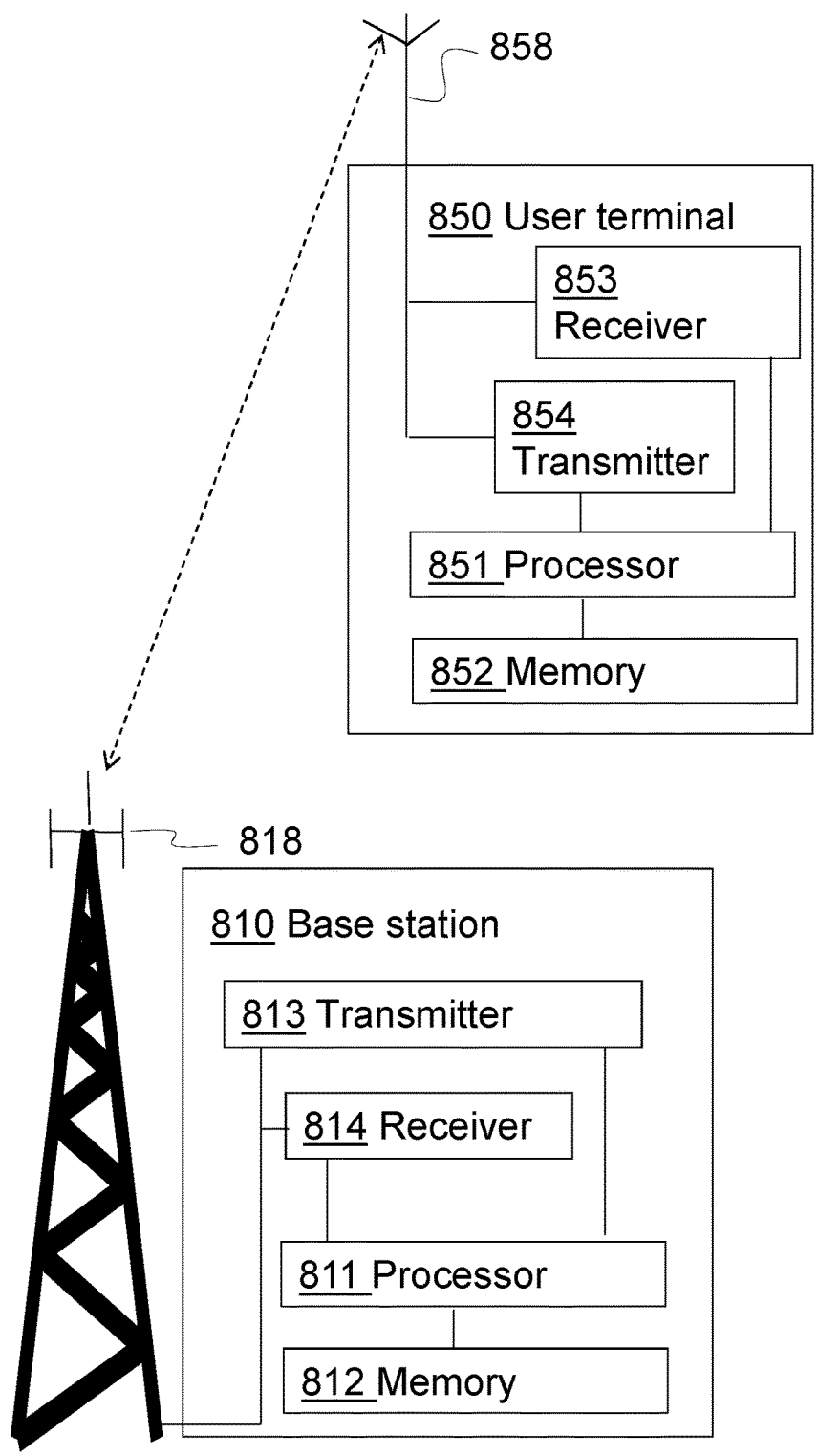
FIG. 8 is a block diagram illustrating embodiments of the base station and the user terminal.

An embodiment of a base station 810 of a wireless communication system and a user terminal 850 is illustrated in the block diagram in FIG. 8. The base station 810 and the user terminal 850 are adapted to mitigate cross-link interference. The base station 810 is configured to serve user terminals in a first cell. The base station 810 comprises a processor 811, a memory 812, and a transmitter 813. The base station typically also comprises a receiver 814, wherein the receiver 814 and the transmitter 813 are connected to one or more antennas 818 via one or more antenna ports in order to communicate wirelessly with user terminals. The memory 812 contains instructions executable by said processor 811, whereby said base station 810 is operative to select a primary TDD configuration designating UL and DL subframes for communication with the user terminals in the first cell. The base station 810 is also operative to determine UL subframes of the primary TDD configuration that are overlapping in time with DL subframes of a TDD configuration used in a second cell. The TDD configuration used in the second cell may be a different TDD configuration than the primary TDD configuration. When the second cell is a neighboring cell close to the served cell, a different TDD configuration used in the neighboring cell causes cross-link interference problems. However, if the second cell is a cell at some distance from the serving cell although the base station serving the second cell is strongly coupled to the base station serving the first cell due to e.g. direct LOS, the second cell may cause cross-link interference even if the TDD configuration used in the second cell is the same as the one used in the first cell due to that the distance introduces a delay.

The base station 810 is further operative to transmit via the transmitter 813 to the user terminal 850 in the first cell, a request to use a supplemental TDD configuration for transmitting UL control information. The UL control information may be a HARQ response. UL subframes of the supplemental TDD configuration are not overlapping in time with DL subframes of the TDD configuration used in the second cell. In one embodiment, the supplemental TDD configuration is the same as the TDD configuration used in the second cell. This would typically be the case when a different TDD configuration is used in a neighbor cell, as in the example embodiment described above with reference to FIG. 3. However, the supplemental TDD configuration may be some other TDD configuration that avoids interference when the UE is transmitting UL control information. In one embodiment, the supplemental TDD configuration is a time shifted version of the primary TDD configuration.

In embodiments, the memory 812 may contain further instructions executable by said processor 811, whereby the base station 810 is operative to identify the user terminal 850 in the first cell scheduled to transmit UL control information in the determined UL subframes of the primary TDD configuration that are overlapping in time with DL subframes of the TDD configuration used in the second cell, and to transmit the request via the transmitter to the identified user terminal.

In embodiments of the base station 810, the memory may contain further instructions executable by said processor whereby said base station 810 is operative to transmit via the transmitter to the user terminal in the first cell, a time value related to the request to use a supplemental TDD configuration. The time value defines a time duration for the requested use of the supplemental TDD configuration. The base station 810 may further be operative to derive the time value based on RRC configuration time windows of the first and the second cell respectively.

The user terminal 850 is configured to be served in the first cell by the base station 810 of the wireless communication system. The user terminal is also configured to use a primary TDD configuration designating UL and DL subframes for communication with the base station. The user terminal comprises a processor 851, a memory 852, a receiver 853, and a transmitter 854. The receiver 853 and the transmitter 854 are connected to one or more antennas 858 via one or more antenna ports in order to communicate wirelessly with the base station 810. The memory 852 contains instructions executable by said processor 851, whereby the user terminal 850 is operative to receive via the receiver 853 from the base station 810, a request to use a supplemental TDD configuration different from the primary TDD configuration for transmitting UL control information. The user terminal 850 is also operative to adopt the supplemental TDD configuration for transmission of UL control information in response to the received request, and to transmit control information via the transmitter to the base station in UL subframes according to the supplemental TDD configuration. The UL control information may be a HARQ response. The supplemental TDD configuration may be different from the primary TDD configuration with regards to the type of TDD configuration. Alternatively, the supplemental TDD configuration may be a time shifted version of the primary TDD configuration.

In embodiments of the user terminal 850, the memory 852 may contain further instructions executable by the processor 851 whereby the user terminal 850 is operative to receive via the receiver 853 from the base station 810, a time value related to the request to use a supplemental TDD configuration. The time value defines a time duration for the requested use of the supplemental TDD configuration. The user terminal 850 may be further operative to adopt the supplemental TDD configuration only during the time duration defined by the received time value.

In an alternative way to describe the embodiment in FIG. 8, the base station 810 comprises means adapted to select a primary TDD configuration designating UL and DL subframes for communication with the user terminals in the first cell. The base station 810 also comprises means adapted to determining UL subframes of the primary TDD configuration that are overlapping in time with DL subframes of a TDD configuration used in a second cell, and means adapted to transmitting, to the user terminal 850 in the first cell, a request to use a supplemental TDD configuration for transmitting UL control information. UL subframes of the supplemental TDD configuration are not overlapping in time with DL subframes of the TDD configuration used in the second cell.

The user terminal 850 comprises means adapted to receive, from the base station 810, a request to use a supplemental TDD configuration different from the primary TDD configuration for transmitting UL control information, means adapted to adopt the supplemental TDD configuration for transmission of UL control information in response to the received request, and means adapted to transmit control information to the base station in UL subframes according to the supplemental TDD configuration.

The means described above are functional units which may be implemented in hardware, software, firmware or any combination thereof. In one embodiment, the means are implemented as a computer program running on a processor.

Figure 9A:
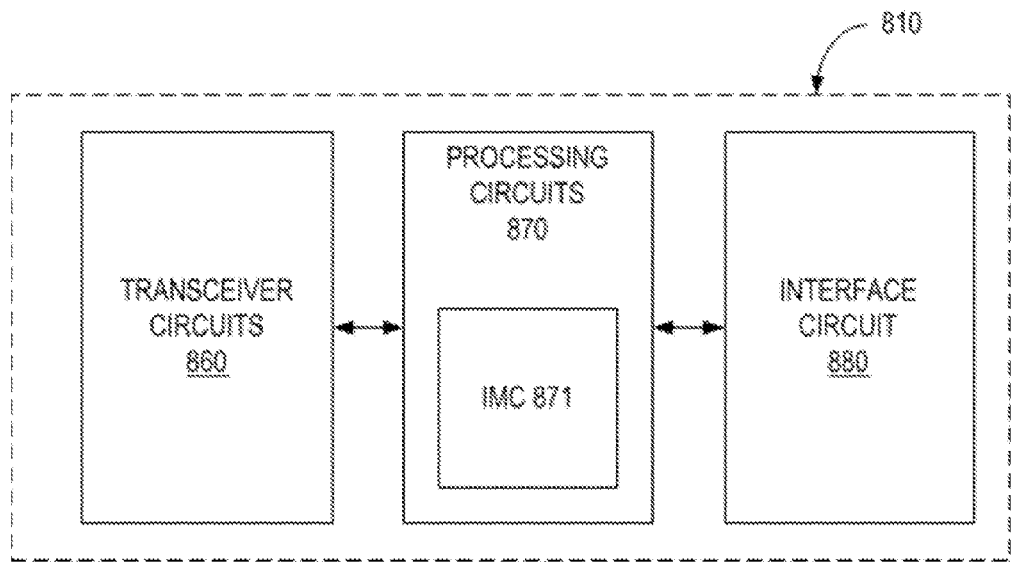
FIGS. 9a-b are block diagrams illustrating embodiments of the base station and the user terminal respectively.

FIG. 9a illustrates an exemplary serving base station 810 according to one embodiment. The base station 810 comprises transceiver circuits 860 for transmitting signals to and receiving signals from UEs in a cell served by the base station 810, processing circuits 870 for processing signals transmitted and received by the base station 810, and an interface circuit for 880 for connecting to a core network (not shown). The processing circuits 870 may include an Interference Mitigation Circuit (IMC) 871 to mitigate interference from neighboring cells. The IMC 871 is configured to detect that a neighboring base station is using a different TDD configuration than the serving base station 810. The IMC 871, in response to such detection, is further configured to determine which UL subframes are impacted and to identify the UEs scheduled to transmit in the impacted UL subframes. The interference detection circuit is further configured to send a request to the impacted UEs to use a supplemental TDD configuration. The request may specify a time period for using the supplemental TDD configuration.

Figure 9B:
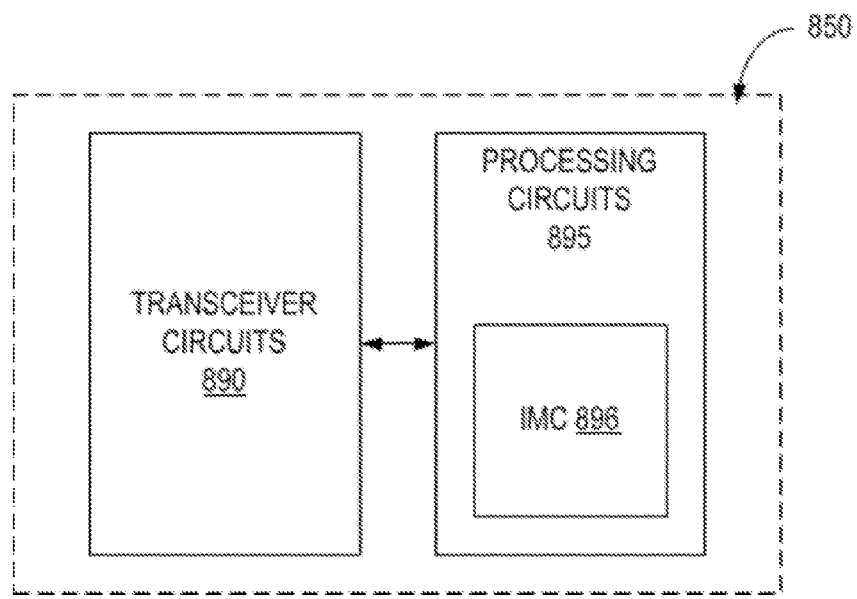

FIG. 9b illustrates an exemplary UE 850 according to one embodiment. The UE 850 comprises transceiver circuits 890 and for transmitting signals to and receiving signals from a serving base station 810, and processing circuits 895 for processing signals transmitted and received by the UE 850. The processing circuits 895 may include an IMC 896 to mitigate interference from neighboring cells. The IMC 896 is configured to adapt the TDD configuration of the UE responsive to a request from the serving base station 810. More particular, the UE is configured to transmit control information in UL subframes according to a primary TDD configuration. The IMC 896 is configured to switch to supplemental TDD configuration responsive to a request from the serving base station. The request may specify a time period for using the supplemental TDD configuration. When the supplemental TDD configuration is in use, the UE transmits control information to the serving base station in UL subframes according to the supplemental TDD configuration.

The above mentioned and described embodiments are only given as examples and should not be limiting. Other solutions, uses, objectives, and functions within the scope of the accompanying patent claims may be possible.

The invention claimed is:

1. A method for mitigating cross-link interference, the method being implemented by a base station of a wireless communication system, the base station serving user terminals in a first cell, the method comprising the base station:
   selecting a primary time division duplex (TDD) configuration designating uplink and downlink subframes for communication with the user terminals in the first cell;
   determining uplink subframes of the primary TDD configuration that are overlapping in time with downlink subframes of a TDD configuration used in a second cell;
   identifying a user terminal in the first cell scheduled to transmit uplink control information in the determined uplink subframes of the primary TDD configuration that are overlapping in time with downlink subframes of the TDD configuration used in the second cell;
   transmitting, to the identified user terminal in the first cell, a request to use a supplemental TDD configuration for transmitting uplink control information, wherein uplink subframes of the supplemental TDD configuration are not overlapping in time with downlink subframes of the TDD configuration used in the second cell; and transmitting, to the identified user terminal in the first cell, a time value related to the request to use the supplemental TDD configuration, wherein the time value defines a time duration for the requested use of the supplemental TDD configuration.

2. The method of claim 1, wherein the TDD configuration used in the second cell is a different TDD configuration than the primary TDD configuration.

3. The method of claim 2, wherein the supplemental TDD configuration is the same as the TDD configuration used in the second cell.

4. The method of claim 1, wherein the supplemental TDD configuration is a time shifted version of the primary TDD configuration.

5. The method of claim 1, wherein the time value is derived based on radio resource control configuration time windows of the first and the second cell respectively.

6. The method of claim 1, wherein the uplink control information is a hybrid automatic repeat request response.

7. The method of claim 1, wherein the time duration is based on a range of time spanning a plurality of subframes configured with the primary TDD configuration.

8. A method for mitigating cross-link interference, the method being implemented by a user terminal in a first cell, served by a base station of a wireless communication system, wherein the user terminal is configured to use a primary time division duplex (TDD) configuration designating uplink and downlink subframes for communication with the base station, the method comprising the user terminal:

receiving a scheduling to transmit uplink control information in uplink subframes of the primary TDD configuration that are overlapping in time with downlink subframes of the TDD configuration used in a second cell;

receiving, from the base station, a request to use a supplemental TDD configuration different from the primary TDD configuration for transmitting uplink control information;

adopting the supplemental TDD configuration for transmission of uplink control information in response to the received request;

receiving, from the base station, a time value related to the request to use the supplemental TDD configuration, wherein the time value defines a time duration for the requested use of the supplemental TDD configuration; and transmitting control information to the base station in uplink subframes according to the supplemental TDD configuration.

9. The method of claim 8, wherein the supplemental TDD configuration is different from the primary TDD configuration with regards to the type of TDD configuration.

10. The method of claim 8, wherein the supplemental TDD configuration is a time shifted version of the primary TDD configuration.

11. The method of claim 8, wherein the supplemental TDD configuration is adopted only during the time duration defined by the received time value.

12. The method of claim 8, wherein the uplink control information is a hybrid automatic repeat request response.

13. A base station of a wireless communication system configured to mitigate cross-link interference and to serve user terminals in a first cell, the base station comprising:
a processor;
a transmitter;
memory containing instructions executable by the processor to cause the base station to be operative to:
select a primary time division duplex (TDD) configuration designating uplink and downlink subframes for communication with the user terminals in the first cell;
determine uplink subframes of the primary TDD configuration that are overlapping in time with downlink subframes of a TDD configuration used in a second cell;
identify a user terminal in the first cell scheduled to transmit uplink control information in the determined uplink subframes of the primary TDD configuration that are overlapping in time with downlink subframes of the TDD configuration used in the second cell;
transmit, via the transmitter and to the identified user terminal in the first cell, a request to use a supplemental TDD configuration for transmitting uplink control information; wherein uplink subframes of the supplemental TDD configuration are not overlapping in time with downlink subframes of the TDD configuration used in the second cell; and
transmit, via the transmitter and to the identified user terminal in the first cell, a time value related to the request to use a supplemental TDD configuration, wherein the time value defines a time duration for the requested use of the supplemental TDD configuration.

14. The base station of claim 13, wherein the TDD configuration used in the second cell is a different TDD configuration than the primary TDD configuration.

15. The base station of claim 14, wherein the supplemental TDD configuration is the same as the TDD configuration used in the second cell.

16. The base station of claim 13, wherein the supplemental TDD configuration is a time shifted version of the primary TDD configuration.

17. The base station of claim 13, wherein the instructions executable by the processor further cause the base station to be operative to derive the time value based on radio resource control configuration time windows of the first and the second cell respectively.

18. The base station of claim 13, wherein the uplink control information is a hybrid automatic repeat request response.

19. A user terminal configured to mitigate cross-link interference, the user terminal configured to be served in a first cell by a base station of a wireless communication system and to use a primary time division duplex (TDD) configuration designating uplink and downlink subframes for communication with the base station; the user terminal comprising:
a processor;
a receiver;
a transmitter;
memory containing instructions executable by the processor to cause the user terminal to be operative to:
be scheduled to transmit uplink control information in uplink subframes of the primary TDD configuration that are overlapping in time with downlink subframes of the TDD configuration used in a second cell;
receive, via the receiver and from the base station, a request to use a supplemental TDD configuration different from the primary TDD configuration for transmitting uplink control information;

adopt the supplemental TDD configuration for transmission of uplink control information in response to the received request;

receive via the receiver and from the base station, a time value related to the request to use a supplemental TDD configuration; wherein the time value defines a time duration for the requested use of the supplemental TDD configuration; and transmit control information, via the transmitter and to the base station, in uplink subframes according to the supplemental TDD configuration.

20. The user terminal of claim 19, wherein the supplemental TDD configuration is different from the primary TDD configuration with regards to the type of TDD configuration.

21. The user terminal of claim 19, wherein the supplemental TDD configuration is a time shifted version of the primary TDD configuration.

22. The user terminal of claim 19, wherein the instructions executable by the processor further cause the user terminal to be operative to:

adopt the supplemental TDD configuration only during the time duration defined by the received time value.

23. The user terminal of claim 19, wherein the uplink control information is a hybrid automatic repeat request response.

* * * * *